3,567,631
REVERSE OSMOSIS MEMBRANES FROM
POLYMERIC EPOXIDES
Carl L. Lukach, Harold M. Spurlin, Edwin J. Vandenberg, and William L. Young III, Wilmington, Del., assignors to Hercules Incorporated, Wilmington, Del.
No Drawing. Filed July 22, 1969, Ser. No. 843,752
Int. Cl. B01d 13/00
U.S. Cl. 210—23
23 Claims

ABSTRACT OF THE DISCLOSURE

Reverse osmosis membranes characterized by a salt-rejecting layer of an amorphous polymer derived from epihalohydrin and an alkylene oxide. The membranes are useful for desalination and other processes involving reverse osmosis.

---

The present invention relates to semipermeable membranes useful for desalting brackish and sea water through reverse osmosis, as well as for other applications involving reverse osmosis.

One of the present commercial methods for the desalination of water involves forcing the saline water under pressure through a semipermeable membrane which discriminates between salt ions and water molecules, allowing water molecules to pass nearly uninhibited through the membrane while rejecting the larger salt ions. At the present time the only semipermeable membranes used commercially in the desalination of water are composed of either cellulose acetate or a derivative of nylon. The cellulose acetate membranes are either symmetric membranes made from dense cellulose acetate or asymmetric ultrathin membranes known as Loeb-type membranes. See U.S. Pats. 3,133,132 and 3,133,137. Membranes made from nylon derivatives are a more recent development and are marketed under the trademark "Permasep" in the form of hollow fibers.

There are two factors that are important in judging the performance of a semipermeable membrane for the desalination of water. First, it must reject at least 95% of salt ions and, secondly, it must have an acceptable flux rate which is a measure of the number of gallons of water per square foot per day (GFD) which can be forced through the membrane. Unfortunately, in the case of any given polymer these two properties are normally inversely proportional to each other, i.e., the higher the salt-rejecting capacity, the lower the flux rate, and vice versa.

From the standpoint of initial performance, asymmetric Loeb-type cellulose acetate membranes are outstanding. In commercial use they are capable of rejecting more than 95% of sodium and chlorine ions at a flux rate of 10–20 gallons per day. However, they possess poor resistance to compaction and are susceptible to hydrolytic and biological degradation. Hence, under many operating conditions, they have short membrane lifetimes. On the other hand, Permasep membranes have excellent resistance to compaction and biological degradation but have extremely low flux rates in the order of 0.01–0.1 GFD.

The present invention relates to novel reverse osmosis membranes useful for desalination of water and other purposes. The membranes of the invention are characterized by a salt-rejecting layer comprising a thin film of a polymeric epoxide, as hereinafter defined. The experimental techniques by which the membranes of the present invention have been prepared have not been sufficiently refined to produce a membrane having a salt-rejecting layer as thin as the ultrathin salt-rejecting layer of the asymmetric Loeb-type cellulose acetate membranes, and for this reason it is not possible to compare directly the flux rates of the present membranes with those of the asymmetric Loeb-type membranes. However, allowing for the greater thickness of the salt-rejecting layer in the membranes of the invention, as prepared to date, the flux rate of the more permeable of the membranes of the invention is surprisingly high and calculated on an equivalent thickness basis equal to or better than the asymmetric Loeb-type membranes. Furthermore, great versatility is achievable in the membranes of the invention in that by variation in chemical and physical structures it is possible to vary salt-rejecting capacity and flux rate over a wide range. Thus, for example, membranes having a very high flux rate and modest salt-rejecting capacity can be prepared which are useful primarily for purposes other than desalination of water, while membranes of good flux rate and high salt-rejecting capacity can be prepared which are eminently useful for desalination of water. In addition the membranes of the invention possess the advantage of being highly resistant to compaction and to hydrolytic and biological degradation and, hence, have long lifetimes under most all operating conditions.

The polymeric epoxide from which the reverse osmosis membranes of the invention are prepared is selected from one of the following classses:

(A) Amorphous copolymers of (1) at least one alkylene oxide having from 2 to 4 carbon atoms and (2) an epihalohydrin in which the alkylene oxide comprises from 5 to 99 mole percent;
(B) Bunte salts of the copolymers of (A); and
(C) Amorphous terpolymers of an epihalohydrin, an alkylene oxide having from 2 to 4 carbon atoms and an amine having the formula

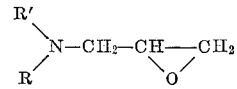

or

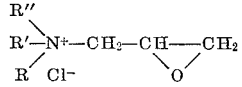

wherein R, R' and R'' are alkyl groups, in which the epihalohydrin and amino epoxide each comprise at least one mole percent and the alkylene oxide comprises at least 40 mole percent;

said polymeric epoxide having a reduced specific viscosity (RSV) of at least 0.5 as measured on a 0.1% solution of the copolymer in alpha-chloronaphthalene (or other appropriate solvent) at 100° C., and a weight average molecular weight of at least 50,000.

Although useful reverse osmosis membranes can be prepared from the polymeric epoxide of classes (A) and (C) without modification, the membranes so prepared tend to have relatively low salt-rejecting capacity, and their prime utility is in applications less critical than the desalination of water. Hence, for desalination applications, it is preferred that the polymeric epoxides of Classes (A) and (C) be cross-linked and required that those of class (B) be cross-linked. Those of class (A) and class (C) are conveniently cross-linked by reaction with a polyfunctional amine, such as hexamethylenediamine, piperazine or various basic polyamides prepared by condensation of aliphatic diamines with polymeric fatty acids, such as will be described more fully hereinafter. The Bunte salts of class (B) are most conveniently cross-linked by reaction with sodium sulfide and in some cases simply by heating or by acid or base treatment. The cross-linking of the polymeric epoxide increases the salt-rejecting capacity of membranes prepared from it, albeit at the expense of a somewhat reduced flux rate.

The membranes of the invention have as their salt-rejecting layer a thin film of a polymeric epoxide as above defined. From the structural viewpoint there are two principal classes of membranes, i.e., (1) membranes which are composed of a thin film of the polymeric epoxide supported on a microporous substrate which is permeable to saline water, and (2) membranes consisting of a thin walled hollow fiber of the polymeric epoxides. The supported membranes of class (1) can be of any convenient shape, e.g., flat, tubular, spiral or corrugated, while those of class (2), being unsupported, are necessarily in the form of hollow fiber. The thin film of the polymeric epoxide, which is a component of both structural classes of membranes, can be prepared by any of the methods known to the art for fabrication of films from moldable polymers such as casting, coating, extrusion, compression molding, and the like. The substrate can be any of the porous materials used in the membrane art for the same purpose. In preparing the membranes of class (1) the polymeric epoxide film is simply disposed as a layer on a substrate and may or may not be adhered thereto.

The following examples are presented for purposes of illustrating the invention and not by way of limitation. Parts and percentages are by weight unless otherwise indicated.

EXAMPLE 1

A 4 x 5-inch sheet of filter material composed of mixed esters of cellulose of 0.01$\mu$ pore size (Millipore Corporation VF filter material) was floated on the surface of deionized water, with the dull side down for 5 minutes. The sheet was lifted with forceps, tilted to drain off excess water, and placed, wet side down, upon a glass plate. A piece of adhesive tape was placed across the top edge to hold the sheet to the glass.

A 10 g. sample of a copolymer of ethylene oxide and epichlorohydrin, containing 75 mole percent EO and of RSV 4.9 was dissolved in 200 ml. of toluene. The solution was filtered under pressure through a 1.2$\mu$ pore size filter. To 20 ml. of this 5% (w./v.) solution was added 2.0 ml. of a filtered solution of a basic polyamide (cross-linking agent) in toluene (20%). This amount of polyamide corresponds to 40 weight percent, based upon the weight of polymeric epoxide present. After mixing well by stirring, the polymer solution was placed near the top of the prewet VF substrate beneath the leading edge of a one-mil casting knife 2½ inches wide. After drawing the solution across the entire length of the substrate with the casting knife, the glass plate was placed in a level position in a cabinet through which filtered air was circulated. After 4 hours, a dry film of calculated thickness 0.5 mil was obtained deposited on the substrate. The glass plate containing the film and substrate was then heated at 80° C. for 16 hours.

The basic polyamide employed in this example was prepared by reacting polymerized soybean oil acids with triethylene tetramine to produce an intermediate resin having an amine number of 225 and a Brookfield viscosity of 500 poises at 40° C., and then reacting 9 parts of the resin with 1 part of tetraethylene pentamine for 2 hours at 200° C., giving a final polyamide having an amine number of 300 and a viscosity at 25° C. of about 500 poises.

A 47-mm. diameter disc was cut from the above membrane. Soaking in water helped remove the cut disc from the glass plate. The membrane was then evaluated as follows.

TEST APPARATUS AND METHOD

Each test cell consisted of a 6-bolt 47-mm. high pressure filter holder which holds a 47-mm. diameter membrane on a support screen between two stainless steel plates. An additional hole was drilled into the top plate, so that the brine solution could enter the cell, circulate over the membrane, and leave the cell. The permeate was collected from the bottom part of the cell and analyzed.

Eight such cells were connected in parallel, through a series of suitable valves, to three back pressure regulators, a pump and a 100-gallon reservoir, to provide a recirculating assembly capable of evaluating eight membranes simultaneously at two different pressures (four cells at each pressure). Pumping rates were up to 0.5 gallon per minute (30 gallons per hour).

The brine solution in the reservoir, unless otherwise indicated, contained approximately 7000 p.p.m. NaCl (2730 p.p.m. $Na^+$, 4200 p.p.m. $Cl^-$) and 3000 p.p.m. $Na_2SO_4$ (930 p.p.m. $Na^+$, 2000 p.p.m. $SO_4^{--}$). It was analyzed each day for $Na^+$ and $Cl^-$ concentration, using a Beckman Expandomatic pH meter and appropriate electrodes. The sulfate ion was calculated from these two values, using the expression: p.p.m. $SO_4^{--}=(2.09$ p.p.m. $Na^+$ minus 1.35 p.p.m. $Cl^-$). Sulfate ion concentrations were also determined independently by a titration method. These values usually agreed well with the calculated value.

The brine solution also contained a small amount of both ethyl violet and Rhodamine B. When a membrane contained a small pinhole, a pink-purple dot from these dyes was visible on the GS filter below the membrane after testing.

The membrane to be tested was cut to a 47-mm. diameter size and placed in the test cell atop two 47-mm. Millipore GS filter discs (0.22$\mu$ pore size; 45,000 GFD at 1500 p.s.i.g.). Depending upon the number of cells in operation, the brine solution was circulated through the cell and over the membrane at the rate of 200–400 ml./min. The membranes were kept first at 500 p.s.i. and then at 1000 p.s.i. for long enough times to collect enough permeate for analysis. The membranes were then kept at 1500 p.s.i. for extended lengths of time while permeate samples were measured and analyzed periodically.

Percent rejection of any ion was calculated from the p.p.m. of the ion in the permeate and the feed solution was as follows.

If X is any ion (e.g., $Na^+$, $Cl^-$ or $SO_4^=$), then

Percent rejection of X $$=\frac{(p.p.m.\ X\ in\ feed\ minus\ p.p.m.\ X\ in\ permeate)}{p.p.m.\ X\ in\ feed} \times 100$$

PERMEATE RATE AND ANALYSIS

Analysis of the permeate collected, compared to the feed solution, gave the following salt rejections.

| | Colorless permeate | | | |
|---|---|---|---|---|
| | Flux, GFD | Percent rejection [1] | | |
| | | Sodium | Chloride | Sulfate |
| Pressure: | | | | |
| 500 | 1.0 | 86.4 | 82.4 | |
| 1,000 | 1.74 | 92.6 | 90.9 | |
| 1,500 | 1.83 | 96.7 | 95.5 | 98.5 |
| 1,500 [2] | 1.74 | 97.5 | 96.4 | 99.6 |

[1] Feed solution analysis–3,300 p.p.m. $Na^+$; 3,750 p.p.m. $Cl^-$; 2,230 p.p.m. $SO_4^-$.
[2] After an additional 580 minutes.

EXAMPLES 2–11

Salt rejections (at 1500 p.s.i.) of membranes prepared in the same manner as Example 1 with different amounts of the polyamide cross-linking agent are given in Table 1. Example 11 demonstrates the presence of a nonsolvent for the polymer.

TABLE 1

| Example No.: | Percent cross-linking agent | Percent rejection | | | Flux, GFD |
|---|---|---|---|---|---|
| | | Na+ | Cl- | SO4-- | |
| | Film 0.5 mil thick | | | | |
| 2 | 0 | 17 | 9 | ------ | 6.1 |
| 3 | 2 | 41 | 25 | ------ | 3.5 |
| 4 | 5 | 69 | 61 | ------ | 1.5 |
| 5 | 10 | 75 | 65 | ------ | 3.0 |
| 6 | 20 | 96.5 | 95 | 98.6 | 1.4 |
| 7 | 30 | 92.6 | 92 | ------ | 1.4 |
| 8 | 75 | 95.9 | 95.6 | ------ | 1.1 |
| | Film 1.25 mils thick | | | | |
| 9 | 50 | 96.9 | 95.6 | ------ | 0.77 |
| 10 | 75 | 95.9 | 94.5 | ------ | 0.8 |
| 11 | [1]45 | 87 | 82 | 95.9 | 1.8 |

[1] Coating solution contained 10 volume percent nonsolvent (heptane).

EXAMPLES 12–23

The following membranes in Table 2 were prepared in the same manner as in Example 1, except that the copolymer used contained 90 mole percent of ethylene oxide and 10 mole percent of epichlorohydrin and had an RSV of 4.31. The test results are for 1500 p.s.i.

TABLE 2

| Example No.: | Percent cross-linking agent | Film thickness, mils | Percent rejection | | | Flux, GFD |
|---|---|---|---|---|---|---|
| | | | Na+ | Cl- | SO4-- | |
| 12 | 0 | 0.5 | 41 | 10 | -------- | 6.1 |
| 13 | 2 | 1.25 | 18 | 10 | -------- | 9.3 |
| 14 | 5 | 1.25 | 32 | 26 | -------- | 5.7 |
| 15 | 10 | 1.25 | 76 | 71 | 93 | 3.0 |
| 16 | 20 | 1.25 | 76 | 71 | -------- | 3.2 |
| 17 | 30 | 0.5 | 88 | 82 | 98 | 3.0 |
| 18 | 30 | 1.25 | 77 | 78 | 96 | 2.1 |
| 19 | 40 | 1.25 | 95.2 | 93 | -------- | 2.0 |
| 20 | 40 | 0.5 | 95.2 | 93 | -------- | 3.1 |
| 21 | 50 | 1.25 | 94 | 92 | -------- | 1.7 |
| 22 | 75 | 1.25 | 91 | 93 | -------- | 1.0 |
| 23 | 75 | 0.5 | 94 | 92 | 99 | 1.3 |

EXAMPLES 24–28

The following membranes in Table 3 were prepared in the same manner as Example 1, except that the copolymers used were of equimolar amounts of ethylene oxide and epichlorohydrin. Evaluation was at 1500 p.s.i.

TABLE 3

| Example No.: | Percent Cross-linking agent | Percent rejection | | Flux, GFD |
|---|---|---|---|---|
| | | Na+ | Cl- | |
| 24 [1] | 2 | 88 | 83 | 0.01 |
| 25 [1] | 5 | 67 | 70 | 0.03 |
| 26 [1] | 10 | 73 | 88 | 0.02 |
| 27 [1] | 20 | 89 | 88 | 0.03 |
| 28 [2] | 20 | 97 | 85 | 0.04 |

[1] Membranes prepared from copolymers of intermediate molecular weight, RSV 2.5.
[2] Membranes prepared from copolymer of high molecular weight, 1.28 million.

EXAMPLES 29–40

The following membranes in Table 4 were prepared in the same manner as Example 1 using a polymeric epoxide containing 75 mole percent ethylene oxide and 25 mole percent epichlorohydrin having an RSV of 4.9 but using different cross-linking agents.

TABLE 4

| Example No.: | Percent cross-linking agent | Percent rejection | | | Flux, GFD |
|---|---|---|---|---|---|
| | | Na+ | Cl- | SO4-- | |
| 29 | [1] 20 | 97.6 | 95.7 | -------- | 1.09 |
| | [2] 97.0 | 94.3 | >99 | | 0.63 |
| 30 | [1] 50 | 98.0 | 94.5 | 96 | 0.55 |
| | | 98.3 | 97.2 | 99.2 | 0.28 |
| 31 | [1] 75 | 97.0 | 95.2 | 96.7 | 0.49 |
| | | 98.3 | 96.9 | -------- | 0.25 |
| 32 | [1] 100 | 92.7 | 88.8 | 95.3 | 0.44 |
| | | 97.7 | 96.1 | -------- | 0.27 |
| 33 | [1] 150 | 97.7 | 95.7 | 97.2 | 0.25 |
| | | 98.9 | 97.9 | 98.1 | 0.15 |
| 34 | [2] 10 | 44 | 29 | 83 | 6.8 |
| 35 | [2] 50 | 56 | 43 | 87 | 2.6 |
| 36 | [2] 75 | 74 | 65 | 89 | 1.4 |
| 37 | [3] 5 | 36 | 26 | -------- | 0.87 |
| 38 | [3] 20 | 17 | 15 | -------- | 1.62 |
| 39 | [4] 5 | 50 | 40 | 88 | 0.90 |
| 40 | [4] 20 | 39 | 23 | -------- | 0.49 |

[1] Cross-linking agent was a polyamide resin prepared by reacting dimerized linoleic acid with triethylene tetramine to give a product having an amine number of 220.
[2] Cross-linking agent was a polyamide resin made by reacting dimerized soybean oil acids with diethylene triamine-amine number 85.
[3] Cross-linking agent was piperazine.
[4] Cross-linking agent was hexamethylene diamine.

EXAMPLES 41–44

Sodium thiosulfate reacts with the chlorine group in epichlorohydrin copolymers to give NaCl and $R-S_2O_3Na$ (the Bunte salt). The amount of sodium thiosulfate added can be adjusted so that the chlorine groups are either completely reacted or only partially reacted. After removing the NaCl by dialysis, the Bunte salt is left in solution in water.

Aqueous solutions of the Bunte salts of a copolymer of 50 mole percent ethylene oxide and 50 mole percent epichlorohydrin having an RSV of 3.8 and the degree of substitution shown in Table 5 were cast over VF Millipore support sheets prewet on one side with water, as described in Example 1. The cast solutions were allowed to dry 16 hours at room temperature and 16 hours at 80° C. The membranes were then cut and evaluated as described in Example 1. Rejections at 1500 p.s.i. are given.

TABLE 5

| Example No.: | Percent substitution [1] | Aqueous solution concentration, percent | Dry film thickness (mils) | Percent rejection | | | Flux, GFD |
|---|---|---|---|---|---|---|---|
| | | | | Na+ | Cl- | SO4-- | |
| 41 | 78 | 5.2 | 0.5 | 61 | 52 | 80 | 16.1 |
| 42 | 78 | 5.2 | 1.0 | 89 | 85 | 78 | 3.9 |
| 43 | 34 | 6.2 | 1.5 | 65 | 46 | 71 | 3.5 |
| 44 | 15 | 3.8 | 1.0 | 99.6 | 98.6 | 94 | 0.12 |

[1] Percent of available chlorine groups reacted with sodium thiosulfate.

EXAMPLE 45

A solution was prepared from 0.22 g. of $Na_2S \cdot 9H_2O$ and 22 ml. of water. A portion of this solution (2.88 ml.; 0.029 g. $Na_2S \cdot 9H_2O$) was added to 5.0 ml. of a 3.84% aqueous solution of a Bunte salt of a copolymer of 50 mole percent ethylene oxide and 50 mole percent epichlorohydrin having an RSV of 3.8 (in which 15% of the available chlorine groups were reacted with sodium thiosulfate). After stirring, a film was cast over a VF support sheet with a 25 mil casting blade, as described in Example 1. The amount of $Na_2S \cdot 9H_2O$ used in the example was 15%, based upon the amount of polymer.

Evaluation in the usual manner gave 79% Na+ rejection, 69% Cl- rejection and 93.0% SO4-- rejection at a flux of 5.8 GFD.

An analogous membrane prepared from a completely substituted Bunte salt of the same copolymer and 2%

$Na_2S \cdot 9H_2O$ gave 41% Na⁺ and 35% Cl⁻ rejections at 40 GFD. The reaction involved in cross-linking is most likely 2R—S₂O₃Na+Na₂S→R—S—S—S—R+2Na₂SO₃
(Bunte salt)

R—S—S—S—R+Na₂SO₃→R—S—S—R+Na₂S₂O₃

The net reaction being

2RS₂O₃Na+Na₂S→R—S—S—R+Na₂S₂O₃+Na₂SO₃

EXAMPLE 46

A membrane was prepared in the same manner as described in Example 1, except that (a) the copolymer used was 80:20 (molar) propylene oxide:epichlorohydrin, (b) the polymer solution concentration in toluene was 3.34%, (c) the amount of polyamide used was 20% based on polymer and (d) a 10 mil casting blade was used to give a calculated dry film thickness of 0.33 mil. Evaluation at 1500 p.s.i. gave rejections of 93.0% for sodium and 93.0% for chlorine, with a flux of 0.06 GFD.

EXAMPLES 47–50

A 2 x 3-inch sheet of Millipore VF filter material with a ½ inch wide strip of poly(tetrafluoroethylene) taped to the bottom for weight (and to prevent curling) was immersed vertically into a beaker containing a 0.5% polymer solution consisting of 311 ml. toluene, 35 ml. of a 5% solution in toluene of a copolymer of 75 mole percent ethylene oxide and 25 mole percent epichlorohydrin having an RSV of 4.9 (1.75 g. polymer) and 3.94 ml. of a 20% polyamide (the same as employed in Example 1) solution in toluene (0.0785 g. polyamide; 45% based on the copolymer). The substrate was immersed for 2 minutes, withdrawn at the rate of 2 ml./min., drained 2 minutes and then dried vertically for 2 hours at room temperature and 16 hours at 80° C.

After cutting and testing the membrane in the usual manner, the remaining substrate was dipped again in the same solution. The procedure was repeated a total of four times with curing for 16 hours at 80° C. after each dipping. Evaluation at 1500 p.s.i. obtained after each dipping is given below:

| Example No.: | Number of dippings | Percent rejection Na⁺ | Cl⁻ | SO₄⁻⁻ | Flux, GFD |
|---|---|---|---|---|---|
| 47 | 1 | 0 | 0 | 0 | 232 |
| 48 | 2 | 55 | 56 | 54 | 9.5 |
| 49 | 3 | 79 | 75 | 84 | 7.6 |
| 50 | 4 | 85 | 84 | 93 | 11.6 |

The salt rejection increased after each dipping. The high flux indicates that the membrane was very thin even after four dippings.

EXAMPLE 51

Diffusion gradient membranes can be made by allowing a solution of the cross-linking agent to diffuse into a dry film of uncross-linked polymeric epoxide. This creates a cross-linking gradient across the film, leading to a tightly cross-linked, less porous structure at one surface, and a loosely cross-linked, more porous structure at the other.

An uncross-linked film of a copolymer of 75 mole percent ethylene oxide and 25 mole percent epichlorohydrin having an RSV of 4.9 was cast over a VF mixed cellulose ester substrate by the method described in Example 1 to give a dry film thickness of 2.5 mils. An aluminum picture-frame mold was then taped over the dry film and the cavity was filled with 13.5 ml. of polyamide (same as employed in Example 1) solution of 2% concentration in toluene. Diffusion was allowed to occur during evaporation and drying at 80° C. for 16 hours.

Evaluation of the dry membrane in the usual manner gave rejections of 93% for Na⁺ and 90% for Cl⁻ at 1500 p.s.i., with a flux of 0.77 GFD.

EXAMPLE 52

A mixture containing 100 parts of an ethylene oxide: epichlorohydrin copolymer (75 mole percent of EO; RSV 4.9) and 0.75 part zinc stearate was blended on a two-roll mill, with both rolls heated to 150° C. The stock was cross-cut and end-rolled while milling for 15 minutes. The temperature of the rolls was lowered to 90° C., and 1.5 parts dioctyl decyl disulfide (stabilizer) and 1.0 part calcium oxide (acid acceptor) were added and blended thoroughly.

After 30 minutes of milling, the compounded stock was fed to an extruder operating at 150° C. and was extruded by forcing the melt through a one-hole (12-mil diameter, 48-mil land) die equipped with a pin for admitting nitrogen into the center of the fiber during extrusion, thus providing the annular orifice necessary for producing a hollow fiber.

The strand of approximately 300 denier was spun into a water bath ³⁄₁₆ inch from the spinneret and maintained at 18° C. The resulting hollow filament was drawn down, using a nominal draw-down ratio of 4× and the relaxation procedure described in U.S. Pat. 3,-408,435. A smooth hollow fiber with an outside diameter of 5 mils and inside diameter of 3 mils was prepared in this manner. The fiber was collected on a poly(tetrafluoroethylene) mandrel and dried for one hour at 26° C. in an ammonia atmosphere followed by gradual heating to 150° C. over a 3-hour period.

Fifty hollow fibers of this type, each three feet long, were inserted into a test cell prepared from a sheath of stainless steel tubing. The fibers were potted with epoxy resin to the stainless steel tubing near both ends, but the fiber ends remained open. The test cell was attached to the test apparatus described previously so that the standard brine solution used in Example 1 passed through the stainless steel tube over the outside of the fibers. The permeate coming through the fibers was collected and analyzed. At 1000 p.s.i., rejections were 96% for sodium ion, 95% for chloride ion, and 99% for sulfate ion with a flux rate of 1.0 GFD.

EXAMPLE 53

A copolymer of 75 mole percent ethylene oxide and 25 mole percent epichlorohydrin having an RSV of 4.9 was reacted with triethylamine in an amount to replace 21% of the chlorine in the copolymer. A membrane prepared from the resultant terpolymer following the procedure of Example 1 gave the following test results:

| Percent rejection: | Flux (GFD) |
|---|---|
| Na⁺, 47 | 13–29 |
| Cl⁻, 43 | 13–29 |
| SO₄⁻⁻, 55 | 13–29 |

Cross-linking of the terpolymer in the aforesaid membrane with 75% of the polyamide-cross-linking agent, defined in Example 1, resulted in a membrane which produced the following test results:

| Percent rejection: | Flux (GFD) |
|---|---|
| Na⁺, 64 | 5–6 |
| Cl⁻, 64 | 5–6 |
| SO₄⁻⁻, 70 | 5–6 |

As has been demonstrated in the examples, excellent reverse osmosis membranes can be prepared from the polymeric epoxides as herein defined. The variation in the chemical structure of the polymeric epoxides which is possible permits a wide variation in the properties of the resulting membranes to tailor them for many different applications.

The polymeric epoxides of class (A) are known compositions having been described, inter alia, in U.S. Pats.

3,135,705 and 3,158,581 to E. J. Vandenberg. They are conveniently prepared by copolymerizing an epihalohydrin with an alkylene oxide having from 1–4 carbon atoms, i.e., ethylene oxide, propylene oxide, and the various isomeric butene oxides. The degree of polymerization is controlled to give a polymer having an RSV of at least 0.5. Although in its broadest aspects, these copolymers can contain from 40–99 mole percent of alkylene oxide, with the balance epichlorohydrin, it is preferred when they are employed in uncross-linked form that the amount of alkylene oxide not exceed 85 mole percent of the copolymer.

The Bunte salts of class (B) are prepared by reacting the copolymers of class (A) with sodium thiosulfate as illustrated in Examples 41–44. The degree of substitution (percent of available chlorine groups reacted with sodium thiosulfate) can vary from about 0.1 to 100%.

The terpolymers of class (C) can be prepared either (a) by terpolymerizing an epihalohydrin with an alkylene oxide and an amino epoxide or (b) by reacting a copolymer of an epihalohydrin and an alkylene oxide with a secondary or tertiary alkylamine in such ratio as to replace only a portion of the chlorine groups in the copolymer. The preparation of terpolymers by the first method, i.e., terpolymerization, is described in U.S. Pat. 3,403,114 to E. J. Vandenberg, while the reaction involved in the second method is illustrated (employing a tertiary amine) in U.S. Pat. 3,428,680 to G. B. Walker et al. Typical amino epoxides that can be employed in the terpolymerization reaction are 1-dimethylamino-2,3-epoxypropane, 1-diethylamino-2,3-epoxypropane, 1-dipropylamino-2,3-epoxypropane, and the like. In making the terpolymers by subsequent reaction with an amine, suitable amines are di- and tri-methylamine, di- and tri-ethylamine, and di- and tri-n-propylamine.

As has been mentioned, the polymeric epoxides can be incorporated in the membrane either in the cross-linked, or, in the cases of classes (A) and (C), uncross-linked state. As a general rule, uncross-linked polymeric epoxides have only modest salt-rejecting capacities but relatively high flux rates and are useful in applications where a high salt-rejecting capacity is not required. Also with respect to uncross-linked polymers, the lower the alkylene oxide content within the limits permitted by the foregoing description, the higher the salt-rejecting capacity of the membrane. On the other hand, when the polymeric epoxides are employed in the cross-linked state, higher salt-rejecting capacities are achieved the greater the alkylene oxide content of the polymer. The summation of the aforesaid is that both the composition of the polymeric epoxide and the degree or absence of cross-linking can be chosen to achieve a predetermined hydrophilic-hydrophobic balance that will result in the performance desired in the ultimate membrane. A high alkylene oxide content favors hydrophilic properties and a high epihalohydrin content hydrophobic properties. The more hydrophilic the polymer, the greater the need for cross-linking. Substantial versatility is therefore achievable by balancing these considerations.

A brief description of the cross-linking of the various polymeric epoxides has been given hereinabove. Although any cross-linking process known to the art can be employed for cross-linking the polymeric epoxides, those of class (A) and class (C) are preferably cross-linked by reaction with a polyfunctional amine which reacts with the chlorine groups in the polymer with liberation of HCl. Desirably, the amine is relatively nonvolatile so that the cross-linking reaction can be carried out at a moderately elevated temperature without employing pressure to prevent volatilization. It is primarily for this reason that the preferred cross-linking agents are low molecular weight polyamides prepared by the condensation of a low molecular weight dibasic fatty acid with an excess of an alkylene polyamine. The dibasic acid is preferably a dimerized fatty acid such as dimerized linoleic acid, dimerized soybean oil acids, and the like; and alkylene polyamine can be, for example, ethylenediamine, diethylenetriamine or triethylenetetramine. Many such polyamides are sold commercially. Those prepared from dimerized linoleic acid and ethylenediamine have the approximate structure

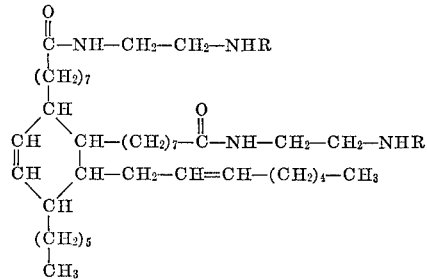

where R is hydrogen or another residue of linoleic acid dimer. These resins generally have molecular weights in the range of 1000–10,000 and softening points in the range of 0–190° C. Their preparation is described in more detail in U.S. Pats. 2,450,940, 2,705,223, 2,881,194 and 2,886,543, among others.

In addition to the aforesaid polyamides, ammonia and other polyamines such as piperazine, hexamethylenediamine, ethylenethiourea, ethylenediamine, propylenediamine, tetramethylenediamine, diethylenetriamine, melamine, pyrazine, p-phenylenediamine, n,n - diethylene diamine, and polymeric amines such as poly(2-methyl-5-vinylpyridine) can be used. Instead of the free amine a salt of the amine can be employed. Internal salts of the amines can also be used as, for example, hexamethylenediamine carbamate, which decompose to the free amine at or below the cross-linking temperature.

The amount of amine cross-linking agent employed for the polymeric epoxides of class (A) is dependent, of course, upon the molecular weight of the cross-linking agent. For the preferred polyamides, the preferred amount ranges from about 2 to 150% by weight of the polymeric epoxide. Cross-linking can be effected by heating at temperatures ranging from about 50° to 155° C. for a time ranging from about 0.05 to 100 hours. If the cross-linking agent is volatile at the temperature chosen for cross-linking, curing should be done in a closed vessel to minimize volatilization.

The Bunte salts of class (B) are most conveniently cross-linked with about 1 to 15% by weight of

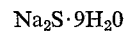

Cross-linking of the Bunte salts with this agent occurs readily at room temperature but higher temperatures may be used. Cross-linking can also be achieved in some cases simply by heating or by treatment with an acid or base.

In the case of any of the polymeric epoxides the cross-linking agent can either be incorporated with the polymer prior to forming it into a film, or the agent can be allowed to diffuse into the film after casting. In all cases, of course, cross-linking is not completed until after the film has been formed.

The examples have shown the preparation of planar membranes comprising a thin film of the polymeric epoxide supported on a microporous substrate permeable to salt ions. The thickness of the film can be varied considerably, for example, from less than 1 micron up to about 2.0 mils, but is desirably as thin as is obtainable by the process employed for its preparation. There has been illustrated preparation of films by solution casting and by dipping of the substrate into a solution of the polymeric epoxide. In addition, satisfactory films can be prepared by spraying, compression molding and extrusion.

In the case of films in any form other than a hollow fiber, supporting of the film upon the substrate is necessary to provide a structure of sufficient strength. Useful substrates are well known in the art of reverse osmosis and can be prepared from various materials such as nylon, cellulose acetate, polyvinyl chloride, nitrocellulose, metal (particularly silver), polytetrafluoroethylene, and other materials. Desirably, the substrate should have as small a pore size as is consistent with permeability to salt ions. A suitable pore size is from about 0.01 to 5 microns.

In the preparation of planar membranes the film of polymeric epoxide can be cast or coated directly upon the substrate or the film can be separately formed and then laid upon the substrate. In using either procedure, prewetting of the substrate with a liquid which does not swell it is desirable to prevent expansion and contraction of the substrate during casting and drying.

It is also possible to fabricate membranes consisting of thin walled hollow fibers of the polymeric epoxide as the examples have described. In such case no substrate is necessary as the stresses to which a hollow fiber membrane are subjected in reverse osmosis processes are obviously different from those to which a planar membrane is subjected. However, composite hollow fibers in which a thin salt-rejecting layer of polymer epoxide is deposited on a substrate can also be used.

Membranes of this invention are eminently useful for desalting brackish water and sea water. In addition, they are also useful in other industrial applications employing the principle of reverse osmosis such as purification of water supplies, purification and concentration of process recycle streams, purification and concentration of waste streams before disposal, and concentration of various materials such as maple syrup, citrus juice, whey, coffee, soup, malt beverages, and spent sulfite pulping liquors. Thus, these membranes are useful in the food and beverage industry, the chemical industry, in the forest products industry and in the medicinal and pharmaceutical industries.

What we claim and desire to protect by Letters Patent is:

1. A reverse osmosis membrane comprising a thin film of a polymeric epoxide supported upon a microporous substrate permeable to salt ions, said polymeric epoxide being selected from the group consisting of:
   (A) amorphous copolymers of (1) at least one alkylene oxide having from 2 to 6 carbon atoms and (2) an epihalohydrin, in which the alkylene oxide comprises from 5 to 99 mole percent;
   (B) Bunte salts of the copolymers of (A); and
   (C) amorphous terpolymers of an epihalohydrin, an alkylene oxide having from 2 to 6 carbon atoms and an amine having the formula

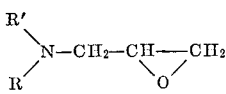

or

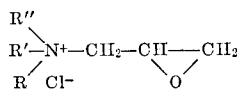

wherein R, R' and R'' are alkyl groups, in which the epihalohydrin and the amine each comprise at least one mole percent and the alkylene oxide comprises at least five mole percent;
and having a reduced specific viscosity of at least 0.5 and a weight average molecular weight of at least 50,000.

2. The membrane of claim 1 in which the polymeric epoxide is a copolymer of ethylene oxide and epichlorohydrin.

3. The membrane of claim 1 in which the polymeric epoxide is a Bunte salt of a copolymer of ethylene oxide and epichlorohydrin.

4. The membrane of claim 1 in which the polymeric epoxide is a terpolymer of epichlorohydrin, an alkylene oxide having from 2 to 4 carbon atoms and an amine having the formula

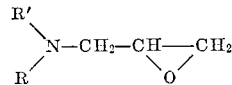

or

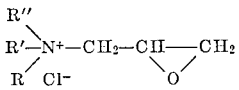

wherein R, R' and R'' are alkyl groups, in which the epichlorohydrin and amino epoxide each comprise at least one mole percent and the alkylene oxide comprises at least 40 mole percent.

5. The process of desalinating water which comprises contacting saline water under pressure with the membrane of claim 1, whereby water molecules are caused to pass through the membrane while the salt ions are rejected from passing therethrough.

6. The membrane of claim 1 in which the polymeric epoxide is cross-linked.

7. The process of desalinating water which comprises contacting saline water under pressure with the membrane of claim 6, whereby water molecules are caused to pass through the membrane while the salt ions are rejected from passing therethrough.

8. The membrane of claim 6 in which the polymeric epoxide is a copolymer of ethylene oxide ad epichlorohydrin.

9. The membrane of claim 8 in which the polymeric epoxide is cross-linked by reaction with a polyfunctional amine.

10. The membrane of claim 6 in which the polymeric epoxide is a Bunte salt of a copolymer of ethylene oxide and epichlorohydrin.

11. The membrane of claim 10 in which the polymeric epoxide is cross-linked by reaction with sodium sulfide.

12. The membrane of claim 6 in which the polymeric epoxide is a terpolymer of epichlorohydrin, an alkylene oxide having from 2 to 4 carbon atoms and an amine having the formula

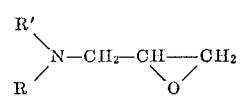

or

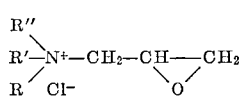

wherein R, R' and R'' are alkyl groups, in which the epichlorohydrin and amino epoxide each comprise at least one mole percent and the alkylene oxide comprises at least five mole percent.

13. The membrane of claim 12 in which the polymeric epoxide is cross-linked by reaction with a polyfunctional amine.

14. A reverse osmosis membrane consisting of a thin walled hollow fiber of a cross-linked polymeric epoxide selected from the group consisting of:
   (A) amorphous copolymers of (1) at least one alkylene oxide having from 2 to 4 carbon atoms and (2) an epihalohydrin, in which the alkylene oxide comprises from 5 to 99 mole percent;
   (B) Bunte salts of the copolymers of (A); and
   (C) amorphous terpolymers of an epihalohydrin, an alkylene oxide having from 2 to 4 carbon atoms and an amine having the formula

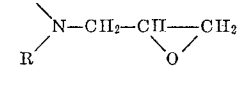

or

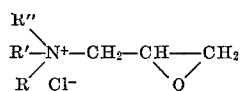

wherein R, R' and R" are alkyl groups, in which the epihalohydrin and amino epoxide each comprise at least one mole percent and the alkylene oxide comprises at least five mole percent;
and having a reduced specific viscosity of at least 0.5 and a weight average molecular weight of at least 50,000.

15. The membrane of claim 14 in which the polymeric epoxide is a copolymer of ethylene oxide and epichlorohydrin.

16. The membrane of claim 14 in which the polymeric epoxide is a Bunte salt of a copolymer of ethylene oxide and epichlorohydrin.

17. The membrane of claim 14 in which the polymeric epoxide is a terpolymer of epichlorohydrin, an alkylene oxide having from 2 to 4 carbon atoms and an amine having the formula

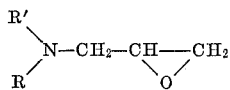

or

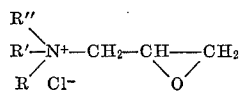

wherein R, R' and R" are alkyl groups, in which the epichlorohydrin and amino epoxide each comprise at least one mole percent and the alkylene oxide comprises at least five mole percent.

18. The process of desalinating water which comprises contacting saline water under pressure with the membrane of claim 14, whereby water molecules are caused to pass through the membrane while the salt ions are rejected from passing therethrough.

19. The membrane of claim 14 in which the polymeric epoxide is cross-linked.

20. The membrane of claim 19 in which the polymeric epoxide is a copolymer of ethylene oxide and epichlorohydrin.

21. The membrane of claim 19 in which the polymeric epoxide is a Bunte salt of a copolymer of ethylene oxide and epichlorohydrin.

22. The membrane of claim 19 in which the polymeric epoxide is a terpolymer of epichlorohydrin, an alkylene oxide having from 2 to 4 carbon atoms and an amine having the formula

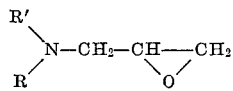

or

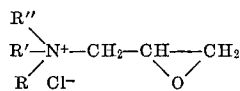

wherein R, R' and R" are alkyl groups, in which the epichlorohydrin and amino epoxide each comprise at least one mole percent and the alkylene oxide comprises at least five mole percent.

23. The process of desalinating water which comprises contacting saline water under pressure with the membrane of claim 19, whereby water molecules are caused to pass through the membrane while the salt ions are rejected from passing therethrough.

References Cited
UNITED STATES PATENTS 3,276,996  10/1966  Lazare _____ 210—22

FRANK A. SPEAR, Jr., Primary Examiner

U.S. Cl. X.R.

210—321, 490, 500

PO-1050
(5/69)

UNITED STATES PATENT OFFICE
CERTIFICATE OF CORRECTION

Patent No. U.S. 3,567,631      Dated March 2, 1971

Inventor(s) Carl A. Lukach, Harold M. Spurlin, Edwin J. Vandenberg and William L. Young III It is certified that error appears in the above-identified patent and that said Letters Patent are hereby corrected as shown below:

Column 11, line 46, "6" should read --4--.

Column 11, line 51, "6" should read --4--.

Signed and sealed this 30th day of November 1971.

(SEAL)
Attest:

EDWARD M. FLETCHER, JR.
Attesting Officer

ROBERT GOTTSCHALK
Acting Commissioner of Pate